United States Patent Office 3,457,293
Patented July 22, 1969

3,457,293
PROCESS FOR THE MANUFACTURE OF
HYDROXYBENZONITRILES
Kozo Sonobe and Toshio Nakaoka, Tokyo, Japan, assignors to Nippon Chemical Industrial Co., Ltd., Tokyo, Japan, a corporation of Japan
No Drawing. Filed July 13, 1965, Ser. No. 471,732
Claims priority, application Japan, July 23, 1964, 39/41,362; Apr. 22, 1965, 40/23,653
Int. Cl. C07c 121/74, 121/52
U.S. Cl. 260—465                          1 Claim

ABSTRACT OF THE DISCLOSURE

A process for the manufacture of hydroxybenzonitriles represented by the formula:

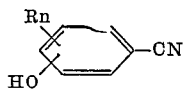

wherein R stands for hydrogen, chlorine, or methyl or nitro radical, and $n$ is an integer of 1 or 2 which comprises a mixture of hydroxybenzoic acid or salt thereof having a general formula:

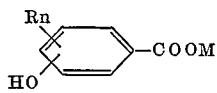

wherein R and $n$ are defined as hereinbefore and M stands for hydrogen atom, alkali metal, alkaline earth metal or ammonium radical, and a phosphorus compound having nitrogen atom directly bonded to phosphorus atom which was obtained by the reaction of 2 to 6 moles of ammonia per 1 mol of chloro compound of phosphorus, is heated at a temperature between 350° C. to 600° C. and distilled out the product from a reaction system.

---

The present invention relates to a new process for the manufacture of hydroxybenzonitriles.

Recently, hydroxybenzonitriles and their derivatives have been used in various fields and particularly the use of these as agricultural chemicals came to be worthy note.

Hydroxybenzonitriles have been heretobefore produced by various processes, for example, by Sandmeyer's process using aminophenols, by a process for dehydrating hydroxybenzaldoxime, by a process for condensing alkoxybenzene with halogens cyanide in presence of Friedel-Crafts type catalyst, but it was difficult to obtain hydroxybenzonitriles cheaply and in a good yield by the above processes.

We have now found a process for industrially and advantageously obtaining the desired hydroxybenzonitriles from hydroxybenzoic acid or salt thereof in very high yield.

The reactants which are used in the process of the present invention are hydroxybenzoic acids or salts thereof, phosphorus halides and ammonia. In the practice of the process of the present invention, the following two procedures can be carried out.

According to the first feature of the present invention, namely, we provide a process for the manufacture of hydroxybenzonitriles represented by a general formula:

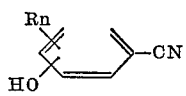

wherein R stands for hydrogen, chlorine, or methyl or nitro radical, and $n$ is an integer of 1 or 2 which comprises a mixture of hydroxybenzoic acid or salt thereof having a general formula:

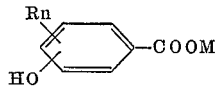

wherein R and $n$ are defined as hereinbefore and M stands for hydrogen atom, alkali metal, alkaline earth metal or ammonium radical, and a phosphorus compound having nitrogen atom directly bonded to phosphorus atom which was obtained by the reaction of 2 to 6 moles of ammonia per 1 mol of chloro compound of phosphorus, is heated at a temperature between 350° C. to 600° C. and distilled out the product from a reaction system.

The phosphorus compounds having nitrogen atom directly bonded to phosphorus atom which may be used as a reactant include those which are obtained by amidation of phosphorus halides, for example, phosphonitrilic chloride, phosphorus trichloride, phosphorus pentachloride, phosphorus oxychloride, phosphorus thio-chloride with ammonia.

Typical embodiments of the above amidation are shown in the following reaction formulas:

   (1)

[$n$ and $m$ are an integer of more than 3].

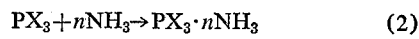   (2)

[$n$ is an integer of 2 to 6].

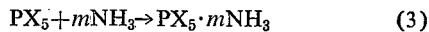   (3)

[$m$ is an integer of 2 to 10].

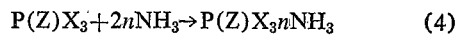   (4)

[$n$ is an integer of 2 to 6].

In the above Formulas 2 to 4, X stands for halogen atom and Z stands for oxygen or sulfur atom.

In the reactions mentioned under Formulas 1 to 4 above it is difficult to completely substitute halogen atoms in the phosphorus halides with amide radicals, and it is also difficult to isolate phosphorus compound from reaction product. It is only possible to easily isolate $P(O)(NH_2)_3$ and $P(S)(NH_2)_3$. However, in the process covered by the present invention the phosphorus compound which has been imperfectly changed to amide as above stated and the amide which coexists with ammonium chloride can sufficiently be used as raw material for nitrilization.

When reaction mixture obtained according to any Formulas 1 to 4 above is heated, phospham $(PN_2H,P_3N_5)$ phosphorylnitrile (PON), which are insoluble in water, are produced and these are also sufficiently effective as raw materials for nitrilization.

Phosphoric amides or phosphoric imides obtained as above have complicated structures owing to the peculiarity of phosphorus compound. Therefore, phosphoric amides or phosphoric imides are not particularly restricted to those mentioned above. It is presumed that phosphoric amides or phosphoric imides produce nitrile by reacting on carboxylic acid or salt thereof as per the following formulas.

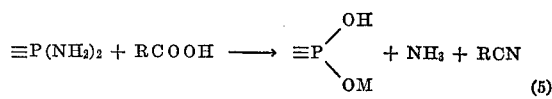   (5)

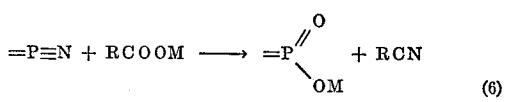   (6)

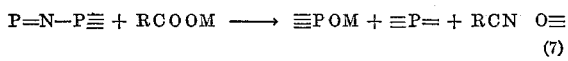

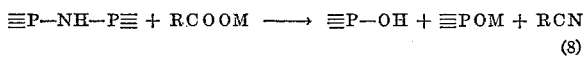

[In the above formulas (5) to (8), R stands for

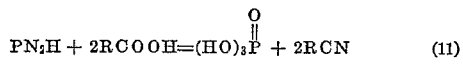
]

It is assumed that phosphorus compounds deoxidize carboxylic acid in succession as above mentioned and that phosphorus compound itself finally becomes phosphoric acid, metaphosphoric acid or low nitrogen-containing phosphoric acids. In case phosphorus compound reacts on hydroxybenzoic acid or salts thereof, there will be a possibility that hydroxyl radical bonds with phosphorus atom in the course of reaction. And practically it is clear that intermediate product is produced. At a high temperature, however, hydroxybenzonitriles dissociate from intermediate product and distil out therefrom almost wtihout decomposition. This is really worthy of surprise.

Typical embodiments are as follows:

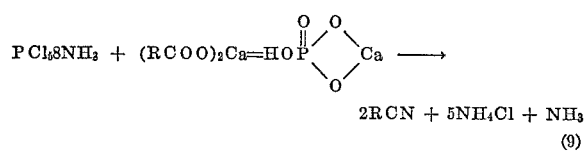

[In the above formulas (9) to (11), R stands for

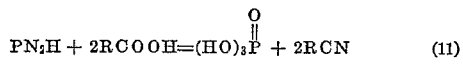
]

In order to work the present invention it is generally necessary to mix phosphorus compound containing nitrogen with benzoic acids or salts thereof, and after grinding the mixture is put into a reactor. As the reaction is a semi-solid reaction, it is necessary to carry out sufficiently both the grinding and mixing. When the mixture is introduced into a furnace heated at a temperature between 350° C. and 600° C., reaction makes progress, and hydroxybenzonitriles will distil out together with ammonia, ammonium chloride or hydrogen chloride gas.

Hydroxybenzonitriles can be obtained in pure state by extraction of the distillate with an organic solvent. If the reaction temperature is low, it will become difficult to isolate the product from unvolatile intermediate, and if reaction is carried out for a long time under such condition, decomposition of the product will follow and yield will decline. Therefore, the reaction temperature must be suitably controlled depending upon the individual properties of the product and the reaction condition.

The reaction molar ratio of hydroxybenzoic acids to phosphorus compound is varied depending upon the deoxidizability of one phosphorus atom, and a suitable reaction molar ratio is in the range of ½ to 2 mols. of phosphorus compound per mol. of hydrobenzoic acids.

In case wherein free hydroxybenzoic acid or ammonium salt thereof is used as the raw material, the reaction can be smoothly conducted by previously adding sodium chloride and the like to the reaction system.

According to the second feature of the present invention, we provide a process of the manufacture of hydroxybenzonitriles which comprises reacting a hydroxybenzoic acid or salt thereof with a phosphorus halide, then making the reaction mixture absorb ammonia and thereafter heating the obtained solid product to an elevated temperature.

The reaction of hydroxybenzoic acid or salt thereof with phosphorus halide may be carried out directly or in a suitable solvent, if necessary with heating and then the reaction mixture may be allowed to absorb directly ammonia. The obtained solid product is heated to a temperature of more than 300° C., preferably 400° C. to 600° C. to give the desired hydroxybenzonitrile.

The reaction of hydroxybenzoic acids with phosphorus halides is accompanied by complicated reactions. As a result, expected products, for example, acid chlorides, phosphoric esters cannot be isolated by viscous substances can be obtained. In the present invention, however, such intermediate reaction product can be reacted with ammonia and directly obtain the desired product in a high yield without the isolation of the reaction intermediate reaction product.

Typical phosphorus halides which may be used in the process of the present invention are phosphorous trichloride, phosphorus pentachloride, phosphonitrilic chloride, phosphorous thiochloride and chlorophosphonitrile, but phosphorus oxychloride or phosphorus pentachloride can be suitably used.

Phosphorus halides may be used in a ratio of more than ⅔ mol. equivalent per 1 mol. equivalent of hydroxybenzoic acid (but, in the case of phosphorus pentachloride, more than ½ mol. equivalent).

In the heating of solid product which is obtained after the absorption of ammonia, an increase of yield and inhibition against corrosion of reactor can be attained when the solid product is mixed with inorganic salts, for example, calcium sulfate, calcium phosphate, sodium sulfate. The effluent desired product contains more or less inorganic salts such as ammonium chloride and therefore the product is extracted with water or organic solvent to obtain pure hydroxybenzonitriles.

The present invention is illustrated by the following examples in which parts are by weight, unless otherwise stated.

Example 1

Phosphorus oxychloride was reacted with ammonia in chloroform at the temperature of —5° C. to give a mixture (I) of phosphoric triamide PO(NH$_2$)$_3$ and ammonium chloride (ratio=1:3).

14 parts of the mixture (I) thus obtained, 7 parts of parahydroxybenzoic acid and 3 parts of sodium chloride were crushed and mixed and then the mixture was charged into a retort having a long neck. By introducing the retort into a furnace which was heated to 450° C., a reaction was gradually carried out. The produced parahydroxybenzonitrile was distilled out from the neck part of retort together with ammonium chloride and ammonia. The distillate was collected and was extracted with a hot benzene to obtain 5 parts of parahydroxybenzonitrile (yield: 83.3%). When the product was recrystallized from benzene, the melting point of the product was 113° C.

In further embodiments, the mixture (I) was reacted with various benzoic acid as shown in the following Table 1.

TABLE 1

| (I) part | Various benzoic acids $R_n$-C₆H₃(OH)-COOM | Part | Addition agent, NaCl | Reaction temperature, °C. | Yield, part | Yield, percent | M.P., °C. |
|---|---|---|---|---|---|---|---|
| 14 | HO—⌬—COONa | 7.9 | | 550 | 5.2 | 87 | 113 |
| 14 | (HO—⌬—COO)₂Ca | 7.8 | | 550 | 5.1 | 85 | 113 |
| 14 | HO—⌬(Cl)—COONa | 9.6 | | 550 | 6.5 | 85 | 155 |
| 14 | HO—⌬(Cl,Cl)—COOH | 10.2 | 3 | 550 | 7.5 | 80 | 146 |
| 14 | ⌬(OH)—COOH | 7 | | 450 | 5.3 | 88 | 82 |
| 14 | ⌬(OH)—COONa | 7.9 | | 400 | 3.4 | 57 | 95 |
| 14 | ⌬(CH₃,OH)—COOH | 7.5 | 3 | 450 | 3.8 | 61 | 87 |

Example 2

The mixture (I) was treated with diethylamine in chloroform and the obtained product from which ammonium chloride was thus removed was recrystallized from methanol to obtain pure phosphoric triamide (II).

Using phosphoric triamide (II), reactions were carried out with an operation similar to Example 1. These embodiments are shown in the following Table 2.

Example 3

Phosphoric triamide (II) was charged into a retort and the retort was inserted into a furnace which was heated to 400° C. to give a water-insoluble matter (III) with an evolution of ammonia (analysis: P 50.4%, N 24.3%).

Using the water-insoluble material (III) reactions were carried out with an operation similar to Example 1. These embodiments are shown in the following Table 3.

TABLE 2

| (II) part | Various benzoic acids $R_n$-C₆H₃(OH)-COOM | Part | Addition agent, NaCl | Reaction temperature, °C. | Yield, part | Yield, percent | M.P., °C. |
|---|---|---|---|---|---|---|---|
| 3.4 | HO—⌬—COOH | 5.0 | 2.1 | 450 | 3.9 | 92 | 113 |
| 2.3 | HO—⌬—COOH | 5.0 | 1.4 | 450 | 3.7 | 86 | 113 |
| 3.4 | ⌬(OH)—COOH | 5.0 | 2.1 | 400 | 3.8 | 82 | 82 |

TABLE 3

Various benzoic acids: $R_n$ substituted, HO— benzene —COOM

| (III) part | Structure | Part | Addition agent, NaCl | Reaction temperature, °C. | Yield, part | Yield, percent | M.P., °C. |
|---|---|---|---|---|---|---|---|
| 4 | HO—⟨⟩—COONH₄ | 7.7 | 3 | 450 | 5.6 | 93 | 113 |
| 5 | HO—⟨⟩—COONa | 9.6 | — | 500 | 6.3 | 82 | 155 |
| 4 | ⟨⟩—COOH (OH) | 7 | — | 450 | 5.1 | 85 | 82 |

Example 4

Ammonia was passed through phosphonitrilic chloride in benzene at a temperature of 0° C. to 5° C. to obtain a white precipitate (IV) (analysis: P 21.9%, N 25.2%, Cl 49.7%).

Using the white precipitate (IV), reactions were carried out with an operation similar to Example 1. These embodiments are shown in the following Table 4.

Example 5

The white precipitate (IV) was heated at the temperature of 350° C. in a retort. The obtained material was washed with a cool water to remove a water-soluble material. The matter (V) (analysis: P 49.7%, N 44.6%, Cl 4.8%). Thus obtained material was generally called as "phosphum." Embodiments using the material (V) are shown in the following Table 5.

TABLE 4

Various benzoic acids: $R_n$ substituted, HO— benzene —COOM

| (IV) part | Structure | Part | Addition agent, NaCl | Reaction temperature, °C. | Yield, part | Yield, percent | M.P., °C. |
|---|---|---|---|---|---|---|---|
| 9.1 | HO—⟨⟩—COOH | 7.0 | 2.9 | 500 | 5.0 | 83.3 | 113 |
| 8.5 | HO—⟨⟩—COONH₄ | 7.7 | 3.0 | 500 | 5.2 | 89 | 113 |
| 9.5 | (HO—⟨⟩—COO)Ca | 7.8 | — | 550 | 4.9 | 82 | 113 |
| 9.1 | HO—⟨Cl,Cl⟩—COOH | 10.2 | 3.0 | 550 | 7.5 | 80 | 146 |
| 9.1 | HO—⟨O₂N⟩—COOH | 9.2 | 3.0 | 450 | 4.2 | 51 | 113 |
| 9.1 | ⟨⟩—COONa (HO) | 7.9 | — | 450 | 5.2 | 89 | 82 |
| 9.1 | O₂N—⟨HO⟩—COOH | 7.2 | 3.0 | 450 | 3.8 | 46 | 120 |

TABLE 5

Various benzoic acids: $R_n$ substituted, HO— benzene —COOM

| (V) Part | Structure | Part | Addition agent, NaCl | Reaction temperature, °C. | Yield, part | Yield, percent |
|---|---|---|---|---|---|---|
| 5 | HO—⟨⟩—COONH₄ | 7.7 | 3 | 500 | 5.3 | 88 |
| 5 | HO—⟨⟩—COONa | 7.9 | — | 500 | 5.1 | 85 |
| 6 | (HO—⟨Cl⟩—COO)Ca | 7.8 | — | 550 | 5.0 | 83 |

Example 6

Phosphorus trichloride was reacted with ammonia in benzene at a temperature of 0° C. to 5° C. to obtain a white precipitate (VI) (analysis: P 13.6%, N 30.8%, Cl 46.8%). Embodiments using the white precipitate (VI) are shown in the following Table 6.

hydrochloric acid gas ceased, ammonia was introduced into the reaction system while the reaction system was cooled. When the absorption of ammonia was completed, the obtained white precipitate was filtrated off from the reaction system, dried, introduced in a retort. The dried precipitate in the retort was heated in a furnace which was maintained at the temperature of 550° C. As a result, parahydroxybenzonitrile distilled together with ammonium chloride. After cooling, the distillate was collected and recrystallized from water to obtain 10.6 g. of white plate-like crystals. M.P. 112° to 113° C.

TABLE 6

| (VI) Part | Various benzoic acids $\overset{Rn}{\underset{HO}{\diagdown}}\!\!\!-\!\!\!COOM$ | Part | Addition agent, NaCl | Reaction temperature, °C. | Yield, part | Yield, percent |
|---|---|---|---|---|---|---|
| 7 | HO—⌬—COOH | 7 | 3 | 500 | 3.6 | 60 |
| 7 | ⌬(OH)—COONa | 7.8 | | 500 | 3.2 | 53 |

Example 7

A substance (VII) (analysis: P 8.9%, N 33.2%, Cl 50.3%) which was obtained from phosphorus pentachloride by an operation similar to that of Example 6. These embodiments are shown in the following Table 7.

TABLE 7

| (VII) Part | Various benzoic acids $\overset{Rn}{\underset{HO}{\diagdown}}\!\!\!-\!\!\!COOM$ | Part | Addition agent, NaCl | Reaction temperature, °C. | Yield, part | Yield, percent |
|---|---|---|---|---|---|---|
| 13.2 | HO—⌬—COOH | 4.8 | 2 | 500 | 3.0 | 75 |
| 13.2 | ⌬—COOH (HO) | 4.8 | 2 | 500 | 3.2 | 80 |

Example 8

80 ml. of toluene were added to 13.8 g. of parahydroxybenzoic acid and 15.2 g. of phosphorus oxychloride and then was refluxed with agitation. When the evolution of

Examples 9 to 13

Hydroxybenzonitriles which are described in the following Table 8 were obtained by an operation similar to that of Example 8.

TABLE 8

| Embodiment | Raw material | Amount, g. | ROCl₃, percent | Product | M.P., °C. | Yield, g. |
|---|---|---|---|---|---|---|
| 9 | ⌬(OH)—COOH | 13.8 | 15.2 | HO—⌬—CN | 82 | 10.2 |
| 10 | ⌬(OH)—COOH | 13.8 | 15.2 | ⌬(OH)—CN | 95 | 5.8 |
| 11 | HO—⌬(Cl)—COOH | 17.2 | 17.0 | HO—⌬(Cl)—CN | 155 | 14.1 |
| 12 | HO—⌬(Cl,Cl)—COOH | 20.6 | 20.0 | HO—⌬(Cl,Cl)—CN | 146 | 16.6 |
| 13 | ⌬(CH₃,OH)—COOH | 15.2 | 13.5 | ⌬(CH₃,OH)—CN | 97 | 6.3 |

Example 14

100 ml. of chloroform were added with 13.8 g. of parahydroxy benzoic acid and 14 g. of phosphorus pentachloride and then slightly heated to react them with a violet evolution of hydrogen chloride gas. After the evolution of hydrogen chloride gas was ceased, the reaction system was treated with ammonia with cooling. The deposited precipitate was collected, dried and 10 g. of calcium secondary phosphate added thereto and well mixed therewith. The mixture was charged into a retort and heated in a furnace which was heated at the temperature of 550° C. As a result, parahydroxybenzonitrile distilled out together with by-produced ammonium chloride. By an operation similar to Example 8, 10.4 g. of parahydroxybenzonitrile were obtained.

Example 15

11.5 g. of phosphonitrilic chloride were well mixed with 16.0 g. of sodium methahydroxybenzoate. The mixture was introduced into a flask and heated to 160° C. to form semi-molten matter. The semi-molten matter was then solidified by cooling. The solid matter thus obtained was isolated, and crushed and then benzene added thereto and then ammonia was passed through with mixture. After the absorption of ammonia ceased, 10.7 g. of methahydroxybenzonitrile were obtained by an operation similar to Example 8.

What we claim is:

1. A process for the manufacture of hydroxybenzonitriles represented by the formula

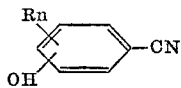

wherein R is selected from the group consisting of hydrogen, chlorine, methyl and nitro radicals and $n$ is an integer of 1 or 2 which comprises: mixing a hydrobenzoic acid or a salt thereof having the general formula

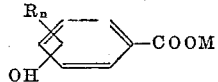

wherein R and $n$ are as defined above and M is a member selected from the group consisting of hydrogen, an alkali metal, an alkaline earth metal, and ammonium radicals with a chloro compound of phosphorus having a nitrogen directly bonded to the phosphorus atom wherein said chloro compound of phosphorous is obtained by the reaction at a temperature of −5° C. to 5° C. of 2 to 6 moles of ammonia per 1 mole of a compound selected from the group consisting of phosphonitrilic chloride, phosphorus trichloride, phosphorus pentachloride and phosphorus oxychloride, said chloro compound of phosphorus having a nitrogen directly bonded to the phosphorus atom being utilized in said mixing in the ratio of ½ to 2 moles per mol of said hydroxy benzoic acid or a salt thereof, heating said mixture at a temperature of 350° C. to 600° C. and distilling out said hydroxybenzonitrile from the reaction system.

References Cited

UNITED STATES PATENTS

| | | | |
|---|---|---|---|
| 2,912,453 | 11/1959 | Moffett | 260—465 |
| 3,012,059 | 12/1961 | Bezman | 260—465 |
| 3,341,566 | 12/1967 | Nakaoka et al. | 260—465 |

FOREIGN PATENTS 1,046,015  12/1958  Germany.

OTHER REFERENCES

Chemical Abstracts, volume 49, p. 13161g.
Chemical Abstracts, volume 55, p. 851a.

CHARLES B. PARKER, Primary Examiner

S. T. LAWRENCE III, Assistant Examiner

U.S. Cl. X.R.

23—357; 260—521, 551